United States Patent [19]
Su

[11] Patent Number: 5,352,535
[45] Date of Patent: Oct. 4, 1994

[54] MESSAGE BOARD

[76] Inventor: Ching-Fang Su, No. 184 Fengren Rd., Fengsan, Kaushiong, Taiwan

[21] Appl. No.: 8,480

[22] Filed: Jan. 25, 1993

[51] Int. Cl.⁵ .............................................. B32B 23/08
[52] U.S. Cl. .................................... 428/511; 428/516; 428/518; 428/520; 428/522; 428/537.5
[58] Field of Search ............... 428/511, 518, 520, 522, 428/537.5, 516

[56] References Cited

U.S. PATENT DOCUMENTS 5,067,287 11/1991 Lewis ...................................... 52/29
5,205,144 4/1993 Montano ........................... 70/456 B

OTHER PUBLICATIONS

Plastics Manufacturing Processing "Plastic films with labeled heat sealing papers" 1993 by Plasczek 100581c.

Primary Examiner—Edith Buffalow
Attorney, Agent, or Firm—Jacobson, Price, Holman & Stern

[57] ABSTRACT

A message board has a surface layer made of a protectively mounted paper or plastic sheet which has a smooth plane adapted to be erasably written thereon with a whiteboard marker. An intermediate mounting layer is overlapped with and connected to the surface layer, and is made of a hard polyvinyl chloride or polyethylene. A base layer is overlapped with and connected to the intermediate mounting layer, and is made of a soft polyvinyl chloride to be attached directly to and removed from a glazy surface repeatedly.

5 Claims, 1 Drawing Sheet

MESSAGE BOARD

BACKGROUND OF THE INVENTION

The present invention relates generally to a message board, and more particularly to an erasable message board which can be repeatedly attached to and removed from any glazy surface as desired.

There are two kinds of conventional message boards, i.e. the blackboard and whiteboard. Blackboards are generally provided in the schools, offices, stations . . . etc., and are utilized to leave messages, teach, or conduct a presentation. Although the blackboard is erasable, and can be written repeatedly, it also has some drawbacks. For example, chalks are needed to write thereon, resulting in that the user's hands will get dirty, and that the chalk powder will pollute the environment and affect his health. Furthermore, since the blackboard is relatively bulky, it is always fixed on the wall, and cannot be moved as desired. The whiteboard includes a plastic plate having a smooth surface, and the user can use a whiteboard marker (i.e. a marking pen) to erasably write on the smooth surface. Although the whiteboard is erasable, it also has smome drawbacks. For example, since the whiteboard is also relatively bulky, it is always hooked on the wall, and cannot be moved as desired. Therefore, the blackboard and whiteboard have several limitations in application.

SUMMARY OF THE INVENTION

The primary object of the present invention is to provide a message board which can overcome the above-mentioned drawbacks. The message board is compact, and can be repeatedly attached to and removed from any glazy surface, such as a glass surface, varnished surface, or the like, as desired without damaging the glazy surface.

Another object of the present invention is to provide a low-cost message board which is particularly suitable for the modernly designed building, equipment or furniture.

In accordance with the present invention, a message board comprises a surface layer having a smooth plane adapted to be erasably written thereon with a whiteboard marker; an intermediate mounting layer connected to the surface layer, and made of a hard polyvinyl chloride or polyethylene; and a base layer connected to the intermediate mounting layer, and made of a soft polyvinyl chloride to be attached directly to and removed from a glazy surface repeatedly.

Certainly, the surface layer can be a protectively mounted paper or a plastic sheet. Certainly, the hardness of the intermediate mounting layer can be ranged from about 5 to 15 PHR and that of the base layer from about 55 to 65 PHR.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
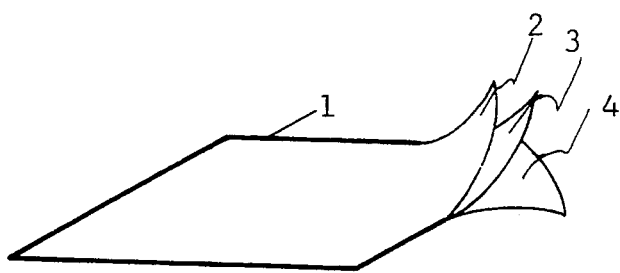
FIG. 1 is a perspective view of a message board in accordance with one preferred embodiment of the present invention.

Referring now to FIG. 1, a message board 1 of the present invention comprises a surface layer 2, an intermediate mounting layer 3, and a base layer 4. The three layers 2, 3, and 4 are overlapped and connected together by an adhesive or the like. Finally, they are preferably rolled together by a rolling machine. The surface layer 2 may be a plastic sheet or a protectively mounted paper which has a smooth plane. The protectively mounted paper here means a paper which is provided with a protective mount or has smooth surfaces. In this manner, messages can be left on the surface layer 2 by a whiteboard marker, and can be erased by a whiteboard eraser or a piece of cloth or the like easily. The intermediate mounting layer 3 may be made of a hard polyvinyl chloride (PVC) or polyethylene (PE), and is utilized to combine the surface layer 2 with the base layer 4. It should be noted that the surface and base layers 2 and 4 are relatively soft, and have different extensibilities so that if the intermediate mounting layer 3 is omitted, and only the surface and base layers 2 and 4 are adhered and rolled together, a curled condition will occur to the rolled layers to result in an uneven surface thereon. The hardness of the intermediate mounting layer 3 is preferably between about 5 to 15 PHR.

Figure 2:
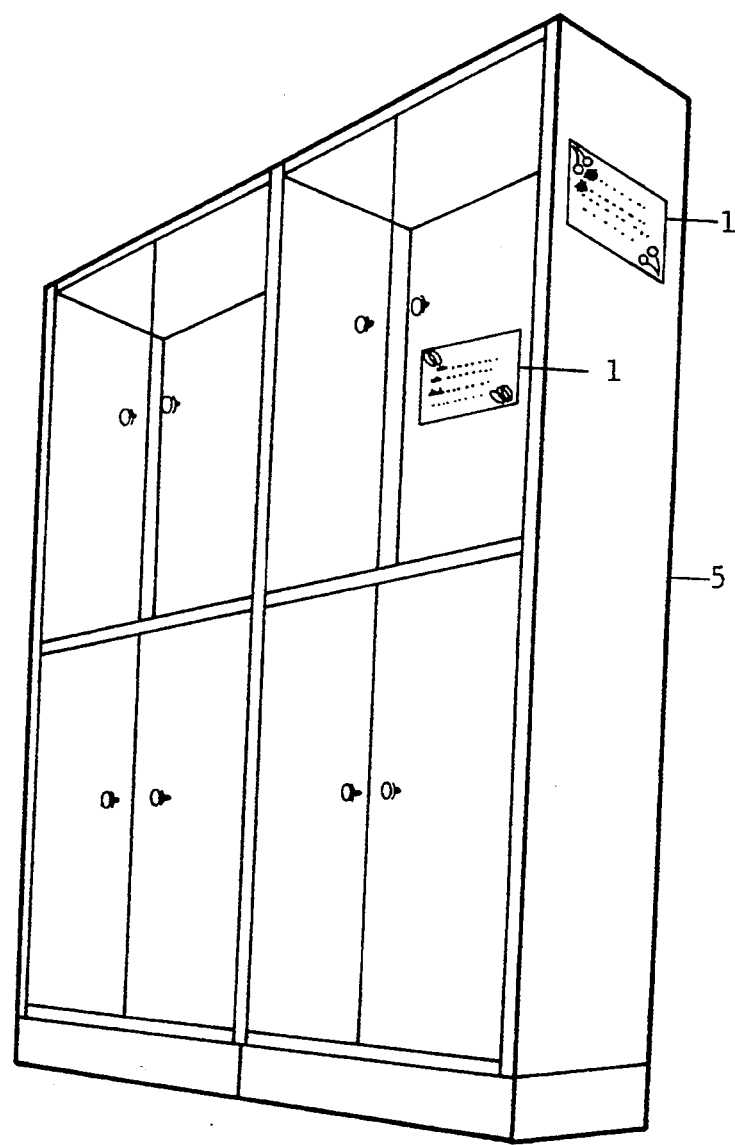
FIG. 2 is a perspective view of a cabinet with two message boards of the present invention attached thereon.

The base layer 4 may be made of a soft polyvinyl chloride, and its hardness is preferably between about 55 to 65 PHR. An article made of the soft polyvinyl chloride material has characteristics that it can be firmly attached to any glazy surface, such as a glass surface, varnished surface, or the like, by itself without any adhesive, and that it can be simply removed from the glazy surface without contaminating the surface, and can be used repeatedly. Therefore, the message board 1 of the present invention can utilize the base layer 4 to have itself attached to a glazy surface, for example the surface of a glass door or window, iron cabinet, mirror, refrigerator, television, etc., without an adhesive or nail-and hook. If desired, the message board 1 can be removed simply, and attached to another glazy surface again. In FIG. 2, there is shown two message boards 1 of the present invention attached to the surface of a cabinet 5. The thickness of the message board 1 is preferably between about 0.2 to 0.5 mm. Since the materials for the message board 1 include only the paper and/or plastics, the message board 1 is of lightweight and elasticity. In addition, when the message board 1 is not in use, it can be easily rolled up for storage.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A three-layer message board comprising:
   a smooth planar surface layer of a material which can be erasably written on with a whiteboard marker;
   an intermediate mounting layer of hard polyvinyl chloride or polyethylene connected to said surface layer; and a base layer connected to said intermediate mounting layer, said base layer being of a soft polyvinyl chloride whereby said base layer can be attached directly to and removed from a glazy surface repeatedly.

2. A message board as claimed in claim 1, wherein said surface layer is a paper sheet.

3. A message board as claimed in claim 1, wherein said surface layer is a plastic sheet.

4. A message board as claimed in claim 1, wherein said intermediate mounting layer is made of a hard polyvinyl chloride having a hardness in a range from about 5 to 15 PHR.

5. A message board as claimed in claim 1, wherein said base layer is made of soft polyvinyl chloride having a hardness in a range from about 55 to 65 PHR.

* * * * *